United States Patent
Chandrasekaran

(10) Patent No.: US 7,702,692 B2
(45) Date of Patent: Apr. 20, 2010

(54) METHOD AND APPARATUS FOR PREVENTING UNAUTHORIZED ACCESS TO COMPUTER SYSTEM RESOURCES

(75) Inventor: Sashikanth Chandrasekaran, San Jose, CA (US)

(73) Assignee: Oracle International Corporation, Redwood Shores ( * ) Notice: Subject to any disclaimer, the term of this patent is extended or adjusted under 35 U.S.C. 154(b) by 898 days.

(21) Appl. No.: 11/355,736

(22) Filed: Feb. 16, 2006

(65) Prior Publication Data

US 2007/0192623 A1 Aug. 16, 2007

(51) Int. Cl.
*G06F 17/30* (2006.01)
*G06F 7/00* (2006.01)

(52) U.S. Cl. .................................................. 707/783
(58) Field of Classification Search ............. 707/104.1, 707/999.009, 999.107
See application file for complete search history.

(56) References Cited

U.S. PATENT DOCUMENTS

2004/0073891 A1* 4/2004 Boucher ..................... 717/127
2006/0026588 A1* 2/2006 Illowsky et al. ............. 717/171

OTHER PUBLICATIONS

Wall et al.: "Programming Perl", Third Edition, Larry Wall, Tom Christiansen and Jon Orwant, O'REILY®, Jul. 2000.*

* cited by examiner

*Primary Examiner*—Kuen S Lu
(74) *Attorney, Agent, or Firm*—Park, Vaughan & Fleming LLP

(57) ABSTRACT

A system is provided to prevent unauthorized access to computer system resources. The system operates by receiving a section of programming language code to execute on a computer system. This programming language code includes a pragma that defines a set of resources that the programming language code has permission to access. The system analyzes the pragma to determine the set of resources. After analyzing the pragma, the system processes the programming language code in accordance with the pragma. The system can further process the program in accordance with the pragma involves creating a sandbox that includes the set of resources defined by the pragma. The system then executes the programming language code within the boundaries of the sandbox.

15 Claims, 3 Drawing Sheets

```
create or replace procedure get_cust (lv_surname in varchar2)
is
        type cv_typ is ref cursor;
        cv cv_typ;
        lv_phone        customers.customer_phone%type;
        lv_stmt         varchar2(32767):='select customer_phone '||
                                        'from customers '||
                                        'where customer_surname='''||
                                        lv_surname||'''';
begin
        open cv for lv_stmt;
        loop
                fetch cv into lv_phone;
                exit when cv%notfound;
                dbms_output.put_line('::'||lv_phone);
        end loop;
        close cv;
end get_cust;
/
```

FIG. 2

```
create or replace procedure get_cust (lv_surname in varchar2)
is
        type cv_typ is ref cursor;
        cv cv_typ;
        lv_phone        customers.customer_phone%type;
        lv_stmt         varchar2(32767):='select customer_phone '||
                                        'from customers '||
                                        'where customer_surname='''||
                                        lv_surname||'''';
begin
        open cv for lv_stmt PRAGMA SANDBOX customers;
        loop
                fetch cv into lv_phone;
                exit when cv%notfound;
                dbms_output.put_line('::'||lv_phone);
        end loop;
        close cv;
end get_cust;
/
```

FIG. 3

```
create or replace procedure get_cust (lv_surname in varchar2)
is ...
begin
         PRAGMA SANDBOX customers
...
end get_cust;
/
```

METHOD AND APPARATUS FOR PREVENTING UNAUTHORIZED ACCESS TO COMPUTER SYSTEM RESOURCES

BACKGROUND

1. Field of the Invention

The present invention relates to computer system security. More specifically, the present invention relates to a method and an apparatus for preventing unauthorized access to computer system resources.

2. Related Art

Databases commonly store highly sensitive data, such as salaries, corporate financial data, and even classified military secrets. Consequently, database systems are typically designed to prevent unauthorized accesses to sensitive data. This problem is compounded by the fact that middle-tier applications often access a database on behalf of various users. Consequently, the database system must often rely on applications to provide access control mechanisms. Although applications that access databases typically ensure that a given query originates from an authorized user, many of these applications are vulnerable to a form of attack known as "SQL injection."

During a Structured Query Language (SQL) injection attack, a hacker provides an input to an application which includes an SQL statement. In doing so, the hacker knows that the application will incorporate this input, which includes the SQL statement, into a query, and that the SQL statement will cause the query to retrieve data which is different from the data that the application intended to retrieve.

SQL injection attacks come in many forms. In a common SQL injection technique, a hacker inserts code into a SQL statement which is intended to return a set of rows R in a set of tables T. However, because of the inserted code, instead of returning R, the database returns a set of rows R' in a set of tables T', where T' is a superset of T.

Another technique employed by hackers to gain control of a system is a buffer-overflow attack. The buffer-overflow attack is typically aimed at programs written in the C or C++ programming languages. During a buffer-overflow attack, a hacker causes a buffer overflow by sending more information to a program than the program can handle. After the buffer overflow occurs, the hacker can then use various tricks to gain control of a computer system. For example, buffer-overflow attacks are commonly used by a hacker to invoke arbitrary programs, such as a shell program, as a privileged user.

Hence, what is needed is a method and an apparatus for preventing unauthorized access to computing resources without the problems listed above.

SUMMARY

One embodiment of the present invention provides a system that facilitates preventing unauthorized access to computer system resources. The system operates by receiving a section of programming language code to execute on a computer system. This programming language code includes a pragma that defines a set of resources that the programming language code has permission to access. Note that a pragma is an instruction to a system or a compiler that enables special features or provides processing help to the system or compiler while processing associated bits of code. Since pragmas are ignored by systems that do not understand them, pragmas are extremely useful because they provide additional flexibility and functionality while not "breaking" systems that do not understand the pragmas. The system analyzes the pragma to determine the set of resources. After analyzing the pragma, the system processes the programming language code in accordance with the pragma.

In a variation on this embodiment, processing the program in accordance with the pragma involves creating a sandbox that includes the set of resources defined by the pragma. The system then executes the programming language code within the boundaries of the sandbox.

In a further variation, executing the programming language code within the boundaries of the sandbox involves determining if the programming language code is attempting to access a resource outside of the boundaries of the sandbox. If so, the system throws an exception.

In a variation on this embodiment, processing the programming language code involves interpreting the programming language code at run-time.

In a variation on this embodiment, processing the programming language code involves compiling the programming language code into executable code. In doing so, the system compiles the executable code in a manner such that the executable code can only access the set of resources defined by the pragma.

In a variation on this embodiment, the set of resources can include database objects.

In a variation on this embodiment, the set of resources can include operating system resources.

BRIEF DESCRIPTION OF THE FIGURES

FIG. 2 illustrates code which is susceptible to SQL injection in accordance with an embodiment of the present invention FIG. 3 illustrates narrow-scope sandboxing in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

Figure 1:
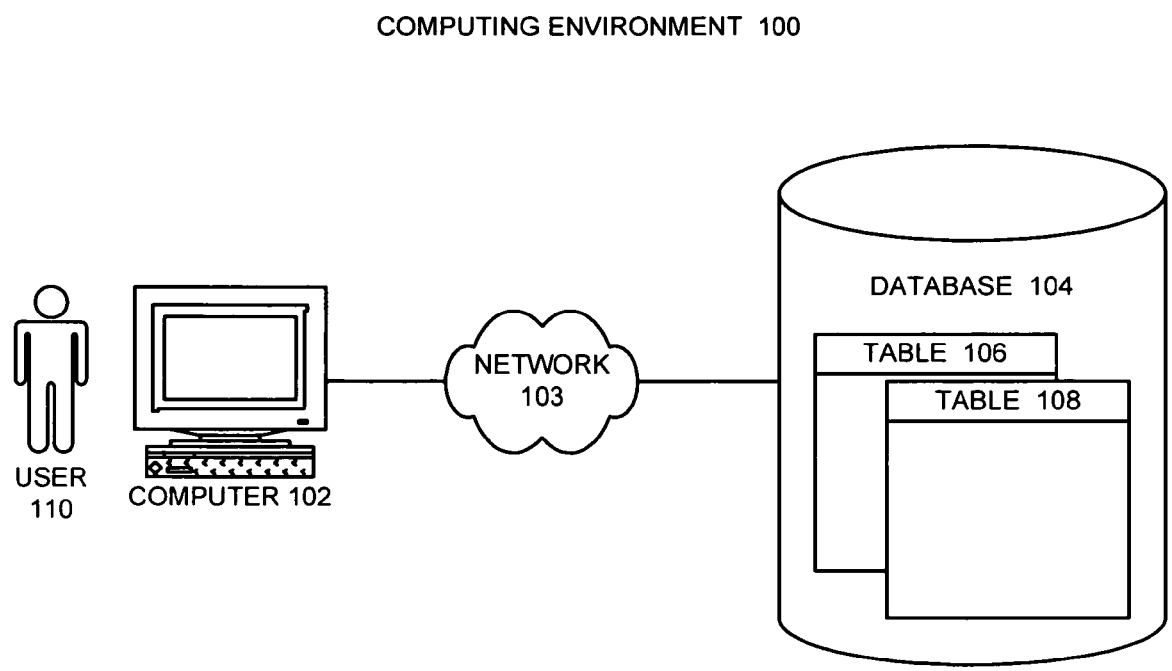
FIG. 1 illustrates a computing environment in accordance with an embodiment of the present invention.

FIG. 1 illustrates a computing environment 100 in accordance with an embodiment of the present invention. Computing environment 100 includes computer 102, network 103, database 104, and user 110.

Computer 102 can generally include any type of computer system, including, but not limited to, a computer system based on a microprocessor, a mainframe computer, a digital signal processor, a portable computing device, a personal organizer, a device controller, and a computational engine within an appliance.

Network 103 can generally include any type of wired or wireless communication channel capable of coupling together computing nodes. This includes, but is not limited to, a local area network, a wide area network, or a combination of networks. In one embodiment of the present invention, network 103 includes the Internet.

Database 104 can include any type of system for storing data in non-volatile storage. This includes, but is not limited to, systems based upon magnetic, optical, and magneto-optical storage devices, as well as storage devices based on flash memory and/or battery-backed up memory. Database 104 includes tables 106 and 108.

As mentioned previously, Structured Query Language (SQL) injection is a common technique that allows hackers to subvert access control mechanisms and to access confidential data stored in a relational database, such as database 104. Most existing solutions for dealing with SQL injection techniques are only aimed at detecting whether a SQL injection attack has already been executed. They typically do not prevent the attack. With the sensitive nature of many data sets, this is simply unacceptable.

Another approach for detecting SQL injection is to store audit logs generated by a "good" workload and to compare these audit logs with audit logs generated during other execution sequences. Discrepancies are flagged as injection attempts.

Not only are these methods not sufficient to prevent SQL injection attacks, but they also suffer from the following drawbacks:
  False negatives: These methods are not complete, and will invariably miss some SQL injection attacks.
  False positives: These methods will often flag benign transactions as attacks.
  Overhead: These methods are hard to deploy, and have a run-time overhead for generating the audit records, and for performing the analysis.

Some existing systems and solutions have been designed to prevent SQL injection attacks, but these solutions have drawbacks as well. The drawbacks of some of the solutions are listed below:
  Avoiding dynamic SQL: This is not always feasible. There are many instances where the SQL text that needs to be executed is not known at compile time. These instances are most common when the SQL SELECT list is not known at compile time or when the SQL WHERE conditions are not known at compile time.
  Using dynamic SQL only with bind variables: (More information on bind variables can be found at: http://www.akadia.com/services/ora_bind_variables.html.) This is also not always possible. In many instances, the SELECT list or the object name may not be fixed at compile time. Moreover, it only takes one incorrectly written code fragment which uses dynamic SQL to break the security of the application.
  Using dynamic roles: In this technique, the user explicitly changes the role during the execution of a procedure or package. The problem with this technique is that the number of roles will proliferate. For example, a complex application may have thousands of packages and procedures, and it may not be feasible to track many different roles.
  Writing specific code to verify all input: As long as humans are needed to write code, the probability that there will be mistakes and bugs is very high.

Note that dynamic SQL statements, unlike static SQL statements, are not embedded into the source code of a program. Instead, dynamic SQL statements are stored in character strings input to or built by the program at run time. Dynamic SQL statements can be entered interactively or read from a storage medium.

As mentioned previously, another technique employed by hackers is a buffer-overflow attack. During such an attack, the hacker can cause a buffer overflow by sending more information than a program can handle. The hacker can then use some tricks to gain control of a computer system.

There has been a lot of previous work aimed at detecting buffer overflows. This work can be broadly classified into two categories: (1) static analysis, and (2) run-time solutions.

In static analysis systems, a compiler analyses the source code, perhaps with the assistance of annotations made by the programmer, and flags potential flaws. These annotations are usually hints to the compiler about the semantics of a function or the validity of pointers.

In one example of a run-time solution, a StackGuard generates machine code that includes built-in tests that verify that the program stack has not been corrupted. (Note that StackGuard is a compiler that generates binaries that incorporate code designed to prevent buffer-overflow attacks. More information can be found at: http://citeseer.ist.psu.edu/cowan98stackguard.html) This incurs a run-time overhead because the check is performed at every function call. Furthermore, it can only catch a certain class of buffer-overflow attacks.

Another approach involves modifying the operating system to prevent instructions from being executed from the data segment (which is mapped read-write and can hence be modified by the hacker). This solution is not comprehensive because a hacker can still modify the program flow to execute code that is already in the code segment. Other techniques, which are less accurate, analyze system call traces and look for anomalous patterns.

In one embodiment of the present invention, SQL applications are "sandboxed" by constraining the set of database tables (or, more generally, the database objects) that can be accessed in a given scope. The narrowest scope is an SQL cursor. Some examples of broader scopes include an SQL procedure, a package of procedures, an application module that accesses multiple packages, or ultimately a database session. Optionally, each scope can be bracketed by the list of database tables that can be accessed within that scope. If a list is not specified, the list of tables is simply inherited from the parent scope. In one embodiment of the present invention, if the list of tables is not specified anywhere, then the list is the set of all tables that the user has permission to access. Thus, the default behavior, when a list is not specified under any scope, is the same as the current behavior, which means that the database session can access all tables that the user has permission to access. As the scope narrows, constraints are shifted from manual requirements supplied by a programmer to run-time constraints handled by an embodiment of the present invention.

One embodiment of the present invention combines two existing ideas—meta-compilation and sandboxing—to prevent an important subset of SQL injection and buffer-overflow attacks. Meta-compilation and sandboxing have been used to solve other unrelated problems. For example, meta-compilation of a programmer's annotations has been used in several program checkers. These checkers try to automatically identify bugs in source code. Sandboxing has traditionally been used to prevent code from accessing memory outside the boundaries of the sandbox.

For example, in the PL/SQL case, the sandbox is checked when the system compiles a SQL cursor. Compiling a SQL cursor generates an execution plan for the SQL statement. The execution plan includes, among other information, a list of database objects that are accessed to execute the SQL statement. At this point the system compares the list of objects to the list specified in the pragma. The system then starts the check from the narrowest scope, and expands the check to the broader scope. While doing so, the system looks for the pragma in the SQL statement itself, or if the pragma is not specified in the statement, checks the pragma in the procedure that is calling the statement, or if the procedure does not have a pragma, the package that contains this procedure, and so on. A dynamic SQL statement is compiled once, but during execution, the system may access the objects hundreds or thousands of times. Because the system performs the pragma check during cursor compilation and not when the object is accessed, the overhead is reduced.

Note that PL/SQL is Oracle Corporation's procedural wrapper over SQL. While PL/SQL is described in detail in one embodiment of the present invention, embodiments of the present invention can use any procedural wrapper over SQL, such as Transact-SQL (T-SQL).

In one embodiment of the present invention, meta-compilation is used to generate a set of objects that can be accessed within a given scope. At run-time, an access error is generated if an object that does not belong to this set is accessed within the given scope. Thus, the program is sandboxed, and the boundaries of the sandbox are determined by the scope and the set generated by the meta-compilation. Unlike Stack-Guard, the access check is performed only when accessing coarse granules of data, such as database objects or tables and operating system files. Hence, the run-time overhead is negligible.

For example, in the operating system case, the system needs a new interface to "register" the pragma with the OS kernel or the OS system call interface. This registration can be a new system call or an extension to an existing system call such as "ioctl". The registration is performed after the OS has loaded dynamic linked libraries (DLLs) from the privileged directories, but before the program's main routine is about to execute. The OS can then associate the pragma with this process and any child process that may be "forked" by the process. When the program issues a file system open call, the OS can check the complete path for the file being opened against the path specified in the registration. Because the system performs the check only during file open and not when the file is accessed, the overhead is reduced.

Narrow-Scope Sandboxing

FIG. 2 illustrates code which is susceptible to SQL injection in accordance with an embodiment of the present invention. Consider the narrowest scope, which is a SQL cursor. The example illustrated in FIG. 2 requires maximum programmer annotation to protect against attacks. This example is a simple example wherein unmodified PL/SQL code is susceptible to SQL injection. In this example, a hacker can send bogus input to obtain the list of all users in the system as follows:

SQL>exec get_cust('x" union select username from all_users where "x"="X');

FIG. 3 illustrates narrow-scope sandboxing in accordance with an embodiment of the present invention. The procedure illustrated in FIG. 2 is modified to prevent the SQL injection by annotating the cursor with a pragma which constrains or sandboxes the cursor to the customers table. By replacing the procedure illustrated in FIG. 2 with the procedure illustrated in FIG. 3, the previous injection attack will now fail because the cursor is constrained to access only the customers table.

Note that in one embodiment of the present invention, the pragma is interpreted at run-time by an interpreter. In another embodiment of the present invention, the pragma is a compilation directive that instructs a compiler to handle appropriate permissions of the application at compile time.

Broad-Scope Sandboxing

Figures 4, 5:
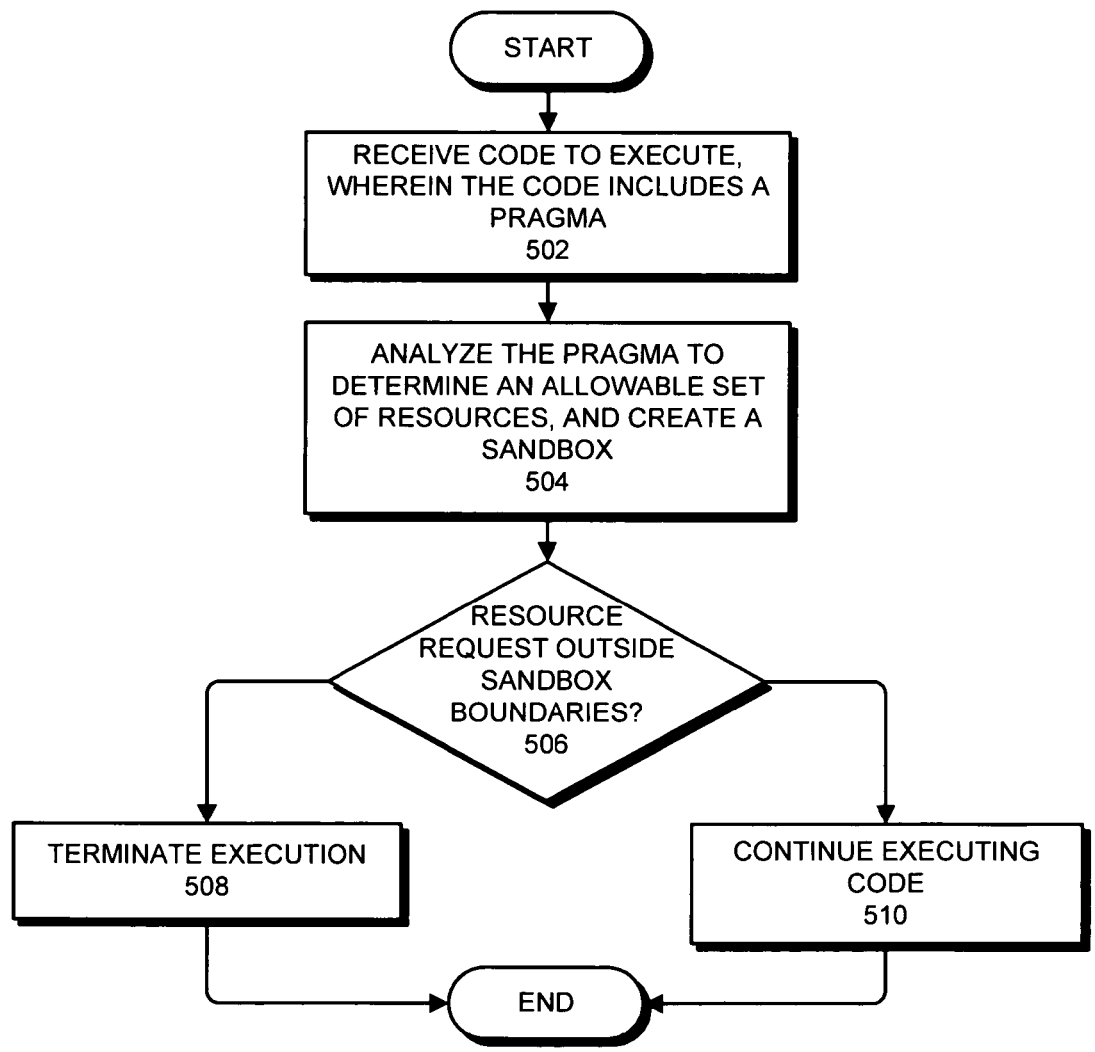
FIG. 4 illustrates broad-scope sandboxing in accordance with an embodiment of the present invention.
FIG. 5 presents a flowchart illustrating the process of executing code in accordance with an embodiment of the present invention.

FIG. 4 illustrates broad-scope sandboxing in accordance with an embodiment of the present invention. It is cumbersome for a programmer to annotate every cursor that has been used for dynamic SQL with a sandbox pragma. In many cases, this will not be necessary. For example, in one embodiment of the present invention, the pragma for the previous procedure could have been applied at the procedure level where it would have applied for all cursors within the procedure. Internally, the database maintains a stack of sandboxes so that when the procedure returns to the caller, the caller's sandbox is restored. The sandboxes should also be unrolled correctly if the procedure throws an exception instead of returning normally.

In one embodiment of the present invention, it is sufficient to place the sandbox for an entire package—where a package is a collection of procedures. This is illustrated in FIG. 4. Allowing wildcard expressions makes it easier to specify a sandbox including multiple tables. For example, a programmer may specify a pragma that allows access to all objects in a particular schema. For example, the following pragma creates a sandbox of all tables in the APPS schema:
PRAGMA SANDBOX apps.*

In one embodiment of the present invention, a package may have a particular sandbox for the scope of the package, but a specific procedure may need access to an additional table. In this instance, the system allows additional objects to be added to the sandbox for the duration of the scope of this procedure. The following adds the customer table to the sandbox:
PRAGMA SANDBOX +customers The previous examples have illustrated the idea using PL/SQL procedures. However, note that the present invention can be easily extended to any programming language by creating an Application Programming Interface (API) to "push" and "pop" sandboxes. In one embodiment of the present invention, this API is implicitly invoked from the PL/SQL run-time engine. By contrast, a middle-tier application, such as a Java DataBase Connectivity (JDBC) application, can use the push and pop APIs to establish sandboxes explicitly. The disadvantage with this approach, when compared to the implicit PL/SQL approach, is that a programmer may incorrectly not pop the sandboxes when the scope is exited abnormally.

As mentioned previously, it is theoretically possible to achieve the same access control by switching roles dynamically. In this technique the programmer uses the "SET ROLE" command to dynamically switch roles. However, the drawback of this technique is that the number of roles will quickly proliferate and become unmanageable. A new role should be created for every unique combination of tables that a procedure or cursor may need to access. The number of roles will be very large for a complex application. Consequently, complex applications login to the database as "super-users" and manage all access control within the application rather than relying on database users. Unfortunately, this exposes the application to SQL injection because all the data is accessible by the super-user.

In contrast, sandboxes can be considered as lightweight roles which a programmer can easily annotate. The pragmas are added in the neighborhood of the code that is sandboxed and does not require administrator intervention.

Sandboxing Operating System Applications

Applications written in C, C++, or other systems programming languages, and that run on top of an Operating System (OS) can also be sandboxed. The difference between these applications and SQL applications is that the objects being sandboxed are operating system files and directories. In one embodiment of the present invention, the pragmas for the list of files and directories that can be accessed by the application can either be specified in a configuration file or when the program is compiled into a binary. Most operating systems need access to system files before the application's "main" entry point. For example, loader routines may be invoked before the main entry point of the application. Consequently, the sandbox is effective only after the application's main function is called. Similarly, the sandbox is deleted after the application's exit function is called because system cleanup routines may need access to privileged files. Fortunately, the main entry and exit points are very well defined.

Unlike SQL applications, sandboxes for OS applications are effective for the duration of the application code's execution. Typically, finer scopes will not be useful. The reason for this is that non-local GOTOs created by exceptions will make the sandbox restoration process error-prone.

Sandboxing the set of directories and files that an OS application will access is useful because there are many applications that need to run as the OS root or super user. For example, an OS application may need to access a privileged networking port less than 1024. However, these OS applications typically do not need access to all the files in the system. For example, the finger daemon needs access only to a user's profile files. There is no need for the finger daemon to access the /bin/sh file. Sandboxing the application will prevent a hacker from obtaining a shell as the root user.

A server needs access only to the files under the home directory and the root directory of the database files. All other files can be sandboxed for the oracle program. Like SQL applications, wildcards will make it easier for the programmer to specify the sandbox. For OS applications the sandbox parameters are the designations of OS files and directories.

Executing Code

FIG. 5 presents a flowchart illustrating the process of executing code in accordance with an embodiment of the present invention. During operation, the system receives code to execute, wherein the code includes a pragma (step 502). Receiving the code can involve retrieving the code from a storage medium attached to the computer system in accordance with normal program execution. The system then analyzes the pragma to determine an allowable set of resources, such as table 106, and creates a sandbox that allows access only to the resources specified by the pragma (step 504). Next, the system determines if any resource requests while executing the code are outside of the sandbox boundaries, such as table 108 (step 506). If so, the system terminates execution (step 508). Otherwise, the system continues executing the code (step 510).

Note that in step 508, the system may take additional measures besides terminating execution of the code. In one embodiment of the present invention, the system throws a security exception and notifies an administrator, such as user 110, that a security exception has been thrown. In another embodiment of the present invention, the program continues to execute in a more restrictive manner.

One advantage of the present invention is that it prevents an important class of injection and buffer-overflow attacks where a hacker is able to access data that the program was not intended to access. There is no post-mortem analysis for detection; the problem is prevented before it occurs. The run-time overhead is negligible because the sandboxes are set up at a coarse level and only need to be checked when a heavyweight operation, such as compiling a cursor or opening a file, is performed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for preventing unauthorized access to database resources, the method comprising:
   receiving, at a computer, a section of programming language code to execute on a computer system,
      wherein the programming language code is annotated with a pragma that defines a set of database objects that the programming language code has permission to access,
      wherein the pragma is run-time interpreted or compilation-directed;
   analyzing the pragma to determine the set of database objects;
   creating a sandbox which includes the set of database objects defined by the pragma;
   executing the programming language code within the boundaries of the sandbox;
   determining if the programming language code is attempting to access a table database object outside the boundaries of the sandbox; and
   if so, generating an exception.

2. The method of claim 1, wherein processing the programming language code involves interpreting the programming language code at run-time.

3. The method of claim 1, wherein processing the programming language code involves compiling the programming language code into executable code, wherein the executable code can only access the set of database object defined by the pragma.

4. The method of claim 1, wherein the pragma comprises a wildcard expression that defines all database objects in a schema.

5. The method of claim 1,
   wherein the programming language code is annotated with a second pragma that defines an additional database object, and
   wherein processing the programming language code further comprises adding the additional database object defined by the second pragma to the sandbox.

6. A computer-readable storage medium storing instructions that when executed by a computer cause the computer to perform a method for preventing unauthorized access to database resources, the method comprising:

receiving, at a computer, a section of programming language code to execute on a computer system, wherein the programming language code is annotated with a pragma that defines a set of database objects that the programming language code has permission to access, wherein the pragma is run-time interpreted or compilation-directed;

analyzing the pragma to determine the set of database objects;

creating a sandbox which includes the set of database objects defined by the pragma;

executing the programming language code within the boundaries of the sandbox;

determining if the programming language code is attempting to access a table database object outside the boundaries of the sandbox; and if so, generating an exception.

7. The computer-readable storage medium of claim 6, wherein processing the programming language code involves interpreting the programming language code at run-time.

8. The computer-readable storage medium of claim 6, wherein processing the programming language code involves compiling the programming language code into executable code, wherein the executable code can only access the set of database objects defined by the pragma.

9. The computer-readable storage medium of claim 6, wherein the pragma comprises a wildcard expression that defines all database objects in a schema.

10. The computer-readable storage medium of claim 6,
   wherein the programming language code is annotated with a second pragma that defines an additional database object, and
   wherein processing the programming language code further comprises adding the additional database object defined by the second pragma to the sandbox.

11. An apparatus for preventing unauthorized access to database resources, comprising:
   a processor;
   a memory;
   a receiving mechanism for receiving a section of programming language code to execute on a computer system,
      wherein the programming language code is annotated with a pragma that defines a set of database objects that the programming language code has permission to access,
      wherein the pragma is run-time interpreted or compilation-directed;
   an analysis mechanism for analyzing the pragma to determine the set of database objects; and
   a processing mechanism for processing the programming language code,
      wherein the processing mechanism is configured to:
      create a sandbox which includes the set of database objects defined by the pragma;
      execute the programming language code within the boundaries of the sandbox;
      determine if the programming language code is attempting to access a table database object outside of the boundaries of the sandbox; and
      if so, generate an exception.

12. The apparatus of claim 11, wherein the processing mechanism is further configured to interpret the programming language code at run-time.

13. The apparatus of claim 11, wherein the processing mechanism further comprises a compilation mechanism for compiling the programming language code into executable code, wherein the executable code can only access the set of database objects defined by the pragma.

14. The apparatus of claim 11, wherein the pragma comprises a wildcard expression that defines all database objects in a schema.

15. The apparatus of claim 11,
   wherein the programming language code is annotated with a second pragma that defines an additional database object, and
   wherein processing the programming language code further comprises adding the additional database object defined by the second pragma to the sandbox.

* * * * *

UNITED STATES PATENT AND TRADEMARK OFFICE
CERTIFICATE OF CORRECTION

PATENT NO. : 7,702,692 B2
APPLICATION NO. : 11/355736
DATED : April 20, 2010
INVENTOR(S) : Sashikanth Chandrasekaran It is certified that error appears in the above-identified patent and that said Letters Patent is hereby corrected as shown below:

In column 2, line 36-37, after "invention" insert -- . --.

In column 8, line 44, in claim 1, delete "the" and insert -- of the --, therefor.

In column 9, line 15, in claim 6, delete "the" and insert -- of the --, therefor.

Signed and Sealed this
Nineteenth Day of April, 2011

David J. Kappos
*Director of the United States Patent and Trademark Office*